(12) United States Patent
Kataru

(10) Patent No.: US 8,700,610 B1
(45) Date of Patent: Apr. 15, 2014

(54) SYSTEMS AND METHODS FOR PROVIDING NEWS ALERTS

(75) Inventor: Naga Sridhar Kataru, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 12/569,587

(22) Filed: Sep. 29, 2009

Related U.S. Application Data

(63) Continuation of application No. 10/671,516, filed on Sep. 29, 2003, now abandoned.

(51) Int. Cl.
*G06F 7/00* (2006.01)
*G06F 17/30* (2006.01)

(52) U.S. Cl.
USPC .................. 707/722; 707/736; 707/999.003

(58) Field of Classification Search
None
See application file for complete search history.

(56) References Cited

U.S. PATENT DOCUMENTS

| | | | |
|---|---|---|---|
| 5,671,342 A * | 9/1997 | Millier et al. | 345/418 |
| 5,848,409 A * | 12/1998 | Ahn | 1/1 |
| 6,578,025 B1 | 6/2003 | Pollack et al. | 707/2 |
| 6,662,195 B1 * | 12/2003 | Langseth et al. | 1/1 |
| 6,810,510 B2 * | 10/2004 | Bakarian et al. | 716/112 |
| 6,990,633 B1 * | 1/2006 | Miyasaka et al. | 715/201 |
| 7,171,415 B2 | 1/2007 | Kan et al. | 707/10 |
| 7,200,801 B2 * | 4/2007 | Agassi et al. | 715/202 |
| 2003/0187716 A1 * | 10/2003 | Lee | 705/10 |
| 2003/0208366 A1 * | 11/2003 | Goldberg | 705/1 |
| 2003/0217121 A1 | 11/2003 | Willis | 709/219 |
| 2003/0225696 A1 * | 12/2003 | Niwa | 705/50 |
| 2003/0229674 A1 * | 12/2003 | Cabrera et al. | 709/207 |
| 2003/0229900 A1 * | 12/2003 | Reisman | 725/87 |
| 2004/0117829 A1 | 6/2004 | Karaoguz et al. | 725/46 |
| 2005/0010647 A1 * | 1/2005 | Durham | 709/212 |
| 2005/0182675 A1 * | 8/2005 | Huettner | 705/14 |

OTHER PUBLICATIONS

Co-pending U.S. Appl. No. 10/662,931; Michael Curtiss et al.; "Systems and Methods for Improving the Ranking of News Articles"; filed Sep. 16, 2003, 39 pages.
"Yahoo! News-Alerts"; http://alerts.yahoo.com/config/set_notification?.t=n; Sep. 25, 2003 (print date); 1 page.
Co-pending U.S. Appl. No. 10/611,267; Krishna Bharat et al.; "Methods and Apparatus for Ranking Documents"; filed Jun. 30, 2003, 43 pages.
Co-pending U.S. Appl. No. 10/611,269; Krishna Bharat et al.; "Methods and Apparatus for Clustered Aggregation of News Content"; filed Jun. 30, 2003, 52 pages.
"Google Alert!"; http://www.googlealert.com; Aug. 14, 2003 (print date); 5 pages.
cnn.com "E-Mail Services"; http://www.cnn.com/EMAIL; Aug. 14, 2003 (print date); 7 pages.
MSNBC "Newstools"; http:/www.msnbc.com/tools/newstools/e/emailextra.asp; Aug. 14, 2003 (print date); 3 pages.

* cited by examiner

*Primary Examiner* — Azam Cheema
(74) *Attorney, Agent, or Firm* — Harrity & Harrity, LLP

(57) ABSTRACT

A system provides news alerts. For example, the system may receive topics of interest to users and periodically obtain news articles that originate from multiple sources of news articles and relate to the topics of interest to the users. The system may generate news alerts that include information associated with one or more of the news articles and provide the news alerts to the users.

18 Claims, 9 Drawing Sheets

| E-MAIL ADDRESS | KEYWORD(S) | TIMING |
|---|---|---|
| USER@EMAILADDRESS.COM | SCHWARZENEGGER | AS IT HAPPENS |
| USER@EMAILADDRESS.COM | HUSSEIN NEW YORK TIMES | ONCE A DAY |
| ... | ... | ... |
| BILL@HOME.NET | KOBE RAPE | AS IT HAPPENS |

FIG. 3

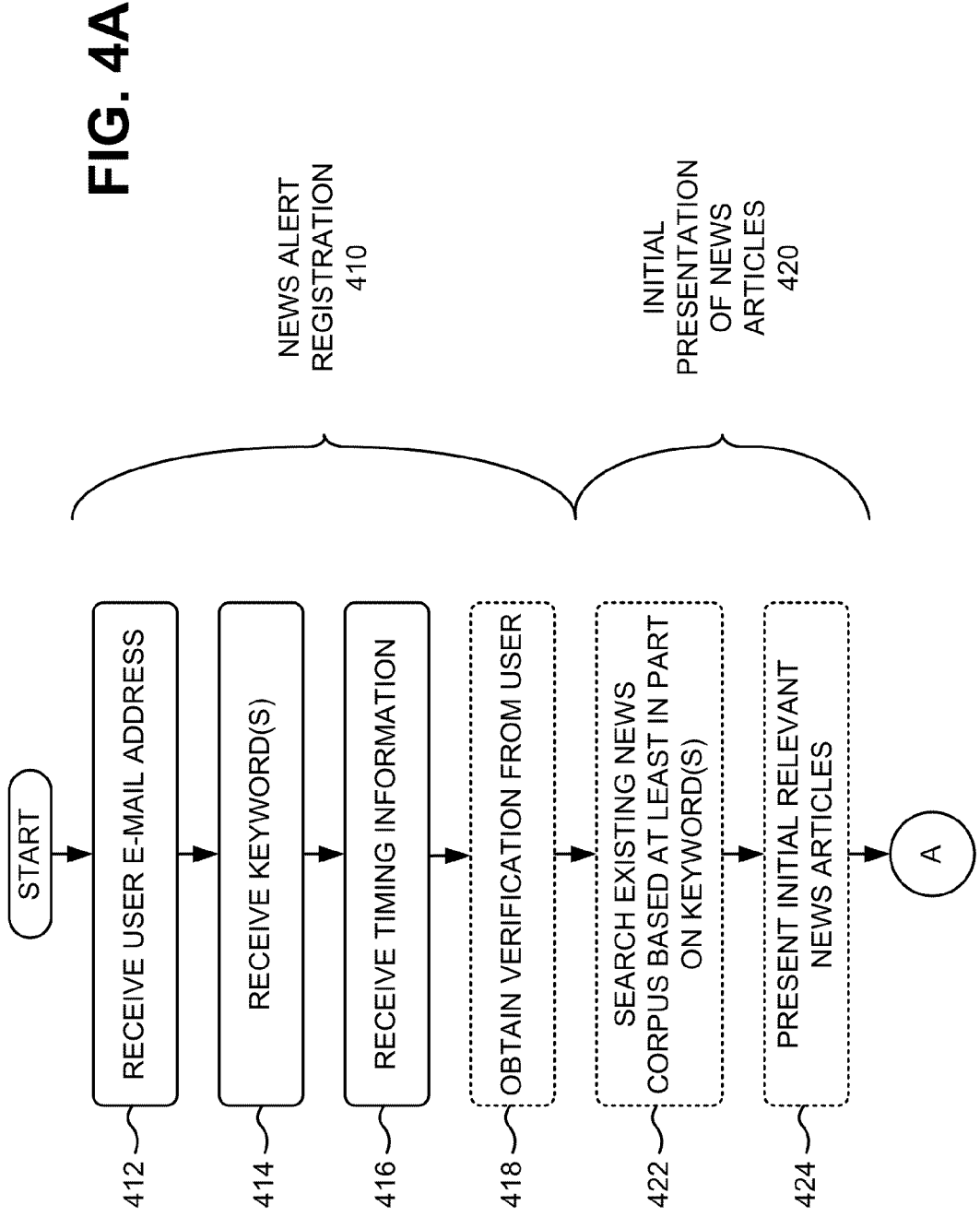

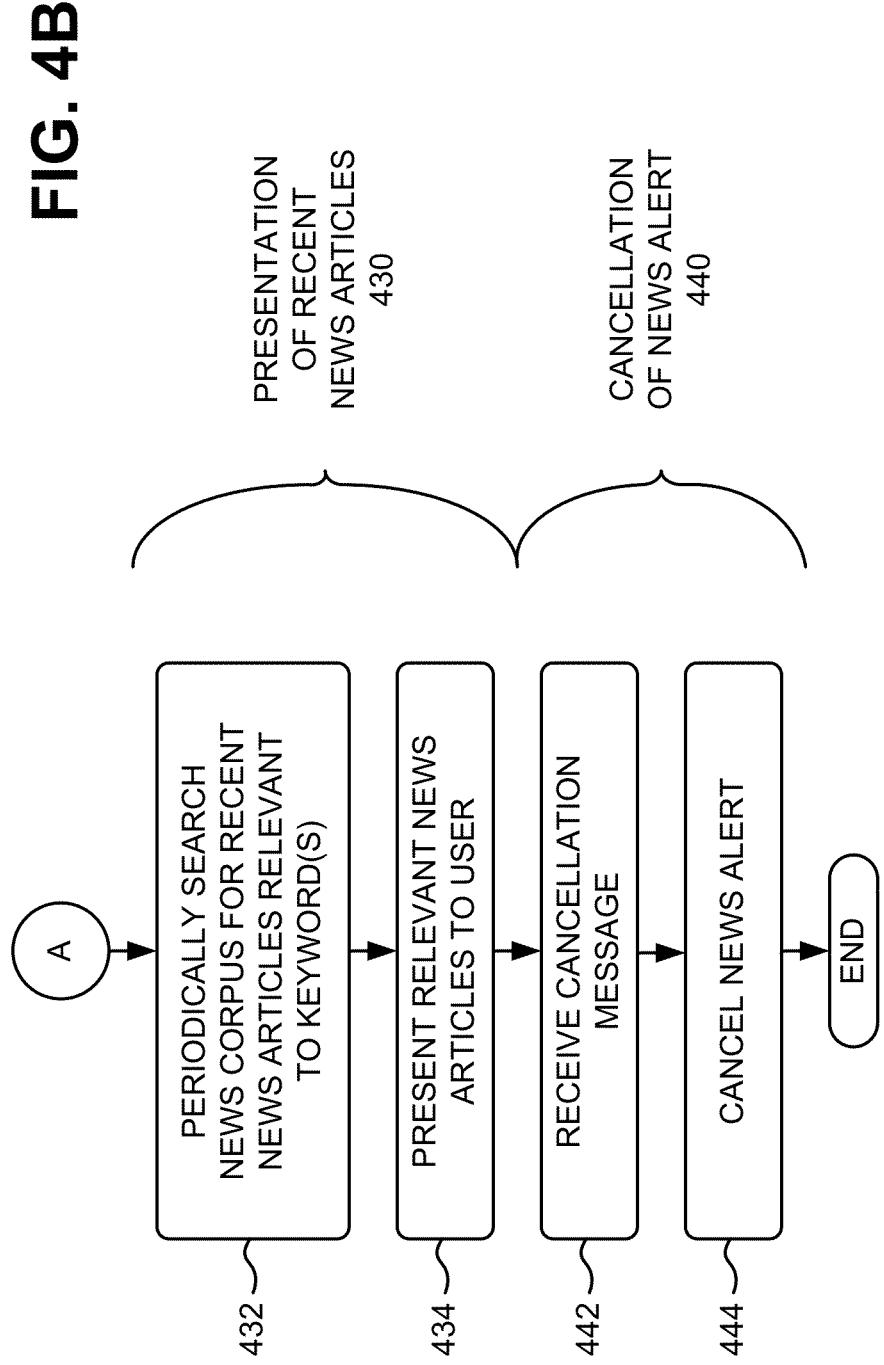

700

FROM: <NEWSALERTS-NOREPLY@GOOGLE.COM>
TO: <USER@EMAILADDRESS.COM>
SENT: WEDNESDAY, AUGUST 13, 2003  10:25 AM
SUBJECT: NEWS ALERTS VERIFICATION E-MAIL

710 — GOOGLE RECEIVED A REQUEST TO START SENDING NEWS ALERTS FOR THE SEARCH [ SCHWARZENEGGER ] TO USER@EMAILADDRESS.COM

720 — VERIFY THIS NEWS ALERT REQUEST:
HTTP://WWW.GOOGLE.COM/NEWSALERTS/VERIFY?S=E0EE18607C42BD13&F=0

730 — CANCEL THIS NEWS ALERT REQUEST:
HTTP://WWW.GOOGLE.COM/NEWSALERTS/REMOVE?S=E0EE18607C42BD13

THANKS,
THE GOOGLE NEWS TEAM

FROM: <NEWSALERTS-NOREPLY@GOOGLE.COM>
TO: <USER@EMAILADDRESS.COM>
SENT: WEDNESDAY, AUGUST 13, 2003 10:25 AM
SUBJECT: GOOGLE NEWS ALERTS - SCHWARZENEGGER

THIS NEWS ALERT BROUGHT TO YOU BY GOOGLE NEWS

810

SCHWARZENEGGER TAPS EXPERTS FOR CAMPAIGN - FOX NEWS
<HTTP://WWW.FOXNEWS.COM/STORY/0,2933,94651,00.HTML>
LOS ANGELES - FINANCIAL AND INVESTMENT GURU WARREN BUFFETT (SEARCH) WILL
SERVE AS ACTOR ARNOLD SCHWARZENEGGER'S SENIOR FINANCIAL AND ECONOMIC ADVISER
IN HIS ...
SEE ALL STORIES ON THIS TOPIC:
<HTTP://NEWS.GOOGLE.COM/NEWS?PERSIST=1&Q=CLUSTER:WWW.FOXNEWS.COM/STORY/
0,2933,94651,00.HTML>

810

LA TIMES SAYS SCHWARZENEGGER SHUFFLING CAMPAIGN STAFF - WHNS
<HTTP://WWW.FOX21.COM/GLOBAL/STORY.ASP?S=1400082>
LOS ANGELES-AP -- THE CAMPAIGN HAS BARELY STARTED -- AND ALREADY A SHAKE-UP
IS REPORTED IN THE ARNOLD SCHWARZENEGGER CAMP. THE LOS ...
SEE ALL STORIES ON THIS TOPIC:
<HTTP://NEWS.GOOGLE.COM/NEWS?PERSIST=1&Q=CLUSTER:WWW.SFGATE.COM/CGI-BIN/
ARTICLE.CGI%3FFILE%3D/CHRONICLE/ARCHIVE/2003/08/13/MN150444.DTL>

820

REMOVE THIS NEWS ALERT ALERT:
HTTP://WWW.GOOGLE.COM/NEWSALERTS/REMOVE?S=E0EE18607C42BD13

830

CREATE ANOTHER NEWS ALERT:
HTTP://WWW.GOOGLE.COM/NEWSALERTS

SYSTEMS AND METHODS FOR PROVIDING NEWS ALERTS

RELATED APPLICATION

This application is a continuation of U.S. patent application Ser. No. 10/671,516 filed Sep. 29, 2003, the entire disclosure of which is incorporated herein by reference.

BACKGROUND OF THE INVENTION

1. Field of the Invention

The present invention relates generally to information retrieval systems and, more particularly, to systems and methods for providing alerts regarding relevant news articles.

2. Description of Related Art

To keep abreast of recent events, people read newspapers, watch TV, and visit web sites. These methods, however, require users to go looking for news and not the other way around. Recently, a number of services have offered users the ability to have news articles sent to them. For example, a news provider, such as CNN, currently allows users to be notified about breaking news headlines by sending them a message via e-mail or by telephone.

Services like these remain relatively unsophisticated. One major challenge is making sure that breaking news is sent only to the people who really care about the topic of the breaking news. To address this issue, some services offer different channels, such as a breaking news channel, a sports channel, a finance channel, and channels relating to other pre-selected topics.

These types of services typically are not adequate enough, however, to serve the users' needs. For example, some people prefer to describe in their own words what articles they are interested in seeing. This is not currently possible because past systems have been limited to providing general breaking news alerts or alerts related merely to a predefined set of broad topics. Also, some people would only like to know about the most relevant articles matching their interests. Furthermore, some people would like to be made aware of all of the coverage about a topic not just news articles from one news source (or a small number of news sources). In addition, some people would like to be made aware of relevant articles when it is convenient for them, not when it is convenient for the service providing the articles.

Therefore, there exists a need for a mechanism that provides users with recent news articles that are relevant to the interests of the users and that are derived from a large number of news sources and permits users to control the time of when they are notified of the news articles.

SUMMARY OF THE INVENTION

Systems and methods, consistent with the principles of the invention, address this and other needs by providing a news alert service that gathers news articles from a large number of sources and presents news articles that are relevant to the interests of its users at times (e.g., when they are notified, the frequency at which they are notified, etc.) that may be specified by the users.

In accordance with one aspect consistent with the principles of the invention, a method for providing news alerts is provided. The method may include receiving registration information that identifies a topic of interest to a user and periodically searching news articles from multiple sources of news articles to identify news articles relating to the topic of interest to the user. The method may also include generating a news alert that includes information associated with one or more of the identified news articles and providing the news alert to the user.

According to another aspect, a system includes a memory and a processor connected to the memory. The memory is configured to store contact information and one or more keywords associated with multiple users. The processor is configured to periodically obtain news articles originating from multiple sources of news articles and relating to the one or more keywords, generate news alerts that include information associated with one or more of the news articles, and present the news alerts to the users based at least in part on the contact information.

According to yet another aspect, a method for providing news alerts is provided. The method may include receiving one or more persistent search terms from a user and periodically identifying current news articles from a corpus of news articles that originated from multiple sources. The current news articles may relate to the one or more persistent search terms. The method may also include sending information associated with the current news articles to the user.

According to a further aspect, a method for notifying users of current news articles of interest to the users is provided. The method may include identifying topics of interest to the users and receiving information regarding a frequency at which the users desire to be notified of current news articles. The method may also include identifying current news articles relating to the topics of interest to the users and sending information associated with the identified current news articles to the users based at least in part on the frequency information.

According to another aspect, a system includes a memory configured to store instructions and a processor configured to execute the instructions in the memory. The processor may receive a search string, identify current news articles relating to the search string, generate a news alert based at least in part on the current news articles, and transmit the news alert.

According to yet another aspect, a data structure embodied on a computer-readable medium usable by one or more processors to generate news alerts for users is provided. The data structure may include a contact field that stores contact information for the users, a keywords field that stores one or more keywords relating to topics of interest to the users, and a frequency field that stores information regarding a frequency at which the users desire to receive the news alerts. The one or more processors may use data from the contact field, the keywords field, and the frequency field to generate news alerts for the users.

According to a further aspect, a method for providing news alerts is provided. The method may include receiving one or more keywords from a user and relevancy ranking news articles based, at least in part, on the one or more keywords. The method may also include generating a news alert based, at least in part, on the ranked news articles and providing the news alert to the user.

BRIEF DESCRIPTION OF THE DRAWINGS

The accompanying drawings, which are incorporated in and constitute a part of this specification, illustrate an embodiment of the invention and, together with the description, explain the invention. In the drawings.

FIG. 3 is a diagram of an exemplary computer-readable medium that may be used by a server of FIG. 1 according to an implementation consistent with the principles of the invention;

FIGS. 4A and 4B are flowcharts of exemplary processing for providing news alerts according to an implementation consistent with the principles of the invention;

FIG. 7 is an exemplary diagram of a registration notification that may be used according to an implementation consistent with the principles of the invention; and FIG. 8 is an exemplary diagram of a news alert that may be used according to an implementation consistent with the principles of the invention.

DETAILED DESCRIPTION

The following detailed description of the invention refers to the accompanying drawings. The same reference numbers in different drawings may identify the same or similar elements. Also, the following detailed description does not limit the invention.

Systems and methods consistent with the principles of the invention may provide persistent news searching and alerting. For example, the systems and methods may permit users to register keyword(s) relating to topics of interest to the users. The systems and methods may periodically query a news corpus to obtain recent (or current) news articles that are relevant to the users' keywords and present these articles to the users, if they were not already presented.

Exemplary Network Configuration

Figure 1:
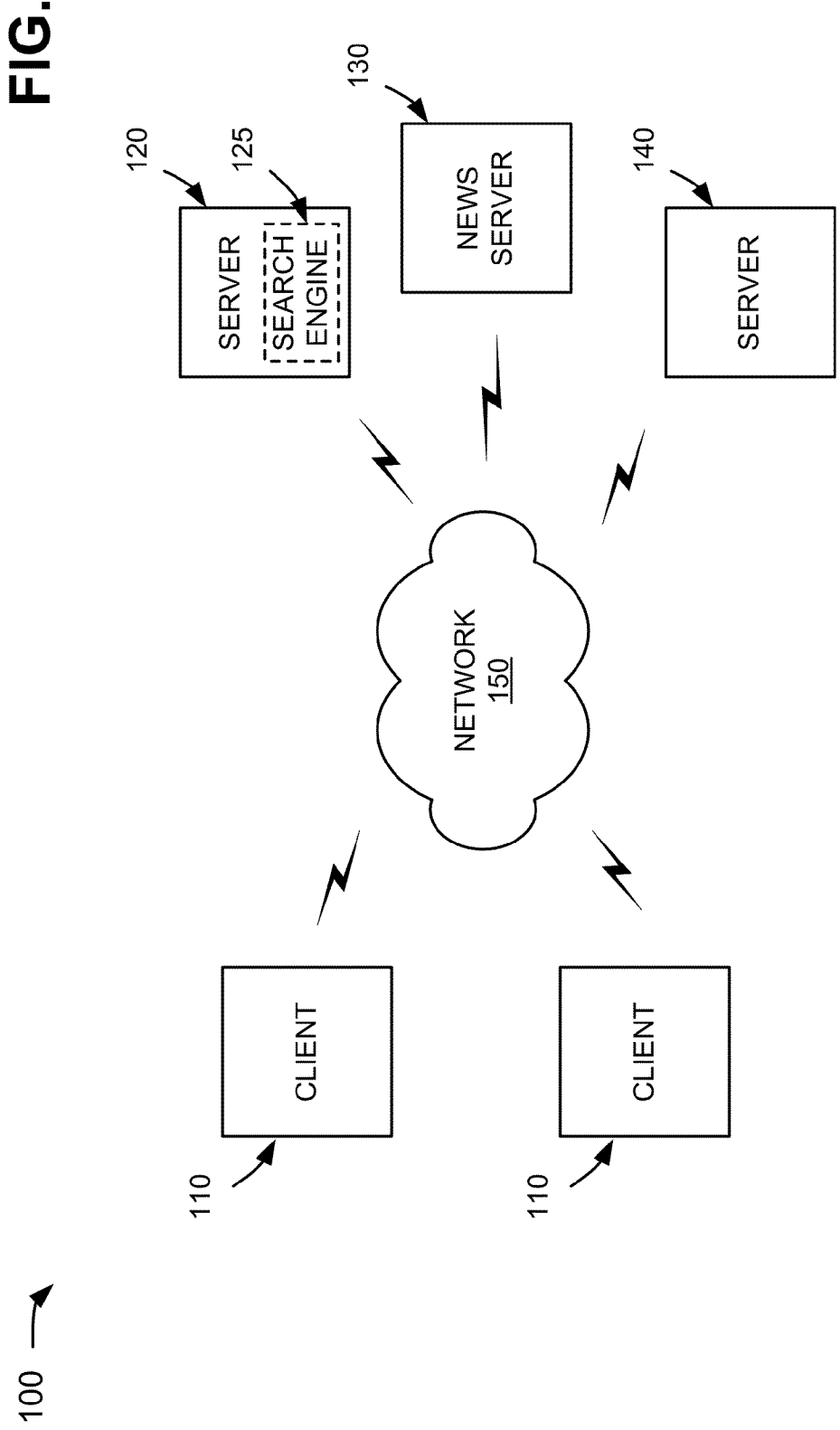
FIG. 1 is a diagram of an exemplary network in which systems and methods consistent with the principles of the invention may be implemented.

FIG. 1 is an exemplary diagram of a network 100 in which systems and methods consistent with the principles of the invention may be implemented. Network 100 may include multiple clients 110 connected to multiple servers 120-140 via a network 150. Network 150 may include a local area network (LAN), a wide area network (WAN), a telephone network, such as the Public Switched Telephone Network (PSTN), an intranet, the Internet, a memory device, another type of network, or a combination of networks. Two clients 110 and three servers 120-140 have been illustrated as connected to network 150 for simplicity. In practice, there may be more or fewer clients and servers. Also, in some instances, a client may perform the functions of a server and a server may perform the functions of a client.

Clients 110 may include client entities. An entity may be defined as a device, such as a wireless telephone, a personal computer, a personal digital assistant (PDA), a lap top, or another type of computation or communication device, a thread or process running on one of these devices, and/or an object executable by one of these device. Servers 120-140 may include server entities that gather, process, search, and/or maintain documents in a manner consistent with the principles of the invention. Clients 110 and servers 120-140 may connect to network 150 via wired, wireless, or optical connections.

In an implementation consistent with the principles of the invention, server 120 may optionally include a search engine 125 usable by clients 110. Server 120 may also provide news alerts to clients 110 according to implementations consistent with the principles of the invention. For example, users of clients 110 may register with server 120 to receive news alerts that relate to keywords provided by the users. Server 120 may use the keywords to identify recent (or current) news articles that relate to the keywords and notify the users of these news articles.

Server 130 may include a news server that gathers, processes, searches, and/or maintains news documents (hereinafter called "news articles"). The news articles may take different forms, such as audio, video, images, text, or a combination of audio, video, images, and/or text. Server 130 may crawl the information on all major (and possibly minor) news sites to amass a corpus of news articles from thousands of sources. Server 130 may rank these news articles using, for example, a technique similar to the ones disclosed in U.S. patent application Ser. No. 10/662,931, entitled "SYSTEMS AND METHODS FOR IMPROVING THE RANKING OF NEWS ARTICLES," filed Sep. 16, 2003; U.S. patent application Ser. No. 10/611,269, entitled "METHODS AND APPARATUS FOR CLUSTERED AGGREGATION OF NEWS CONTENT," filed Jun. 30, 2003; and U.S. patent application Ser. No. 10/611,267, entitled "METHODS AND APPARATUS FOR RANKING DOCUMENTS," filed Jun. 30, 2003, the contents of these applications are hereby incorporated herein by reference.

Server 140 may store or maintain documents, which may include some news articles. For example, server 140 may be one of the servers whose information is crawled by server 130.

While servers 120-140 are shown as separate entities, it may be possible for one or more of servers 120-140 to perform one or more of the functions of another one or more of servers 120-140. For example, it may be possible that two or more of servers 120-140 are implemented as a single server. It may also be possible for one of servers 120-140 to be implemented as multiple, possibly distributed, computing devices.

Exemplary Client/Server Architecture

Figure 2:
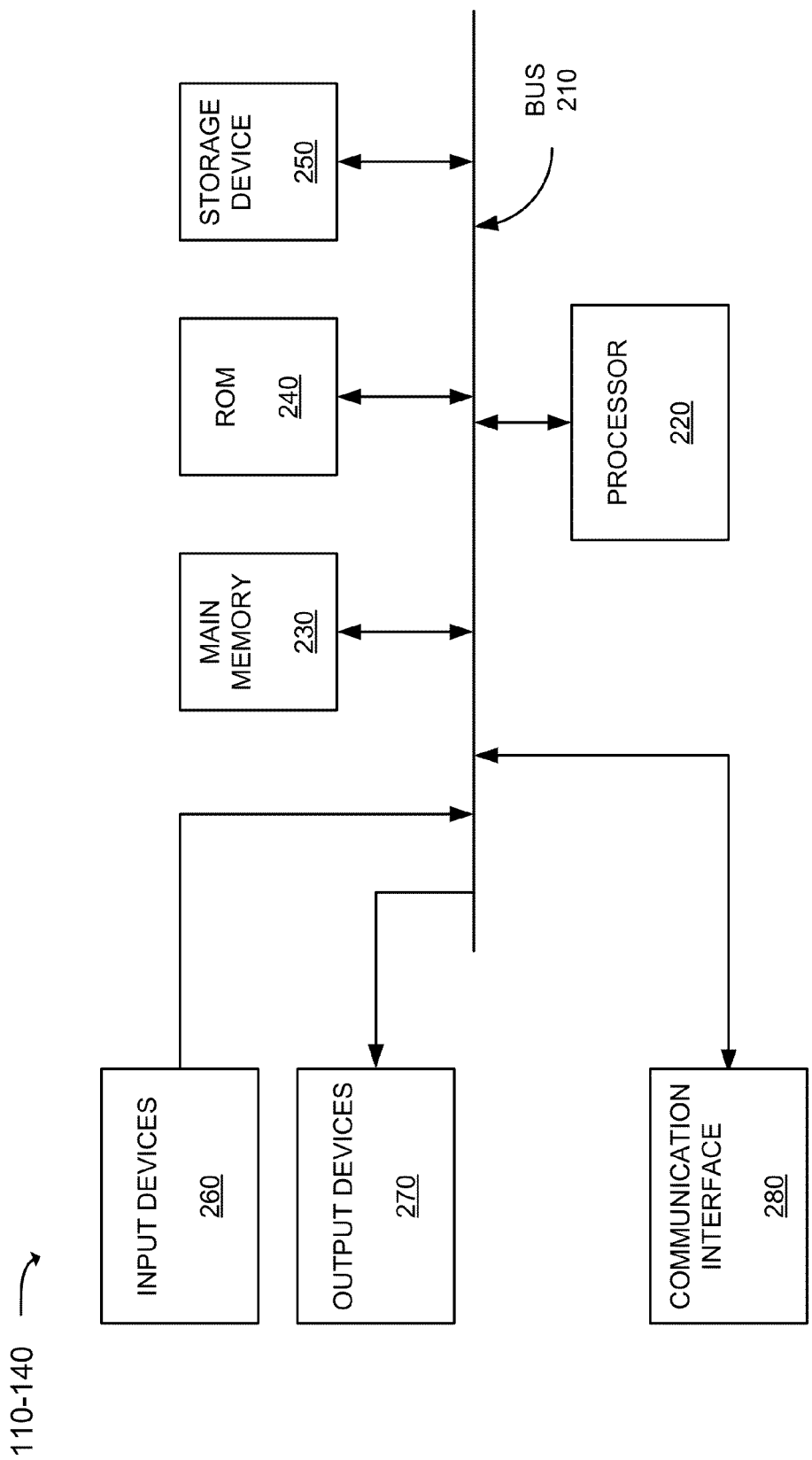
FIG. 2 is an exemplary diagram of a client and/or server of FIG. 1 in an implementation consistent with the principles of the invention.

FIG. 2 is an exemplary diagram of a client or server entity (hereinafter called "client/server entity"), which may correspond to one or more of clients 110 and servers 120-140, according to an implementation consistent with the principles of the invention. The client/server entity may include a bus 210, a processor 220, a main memory 230, a read only memory (ROM) 240, a storage device 250, one or more input devices 260, one or more output devices 270, and a communication interface 280. Bus 210 may include one or more conductors that permit communication among the components of the client/server entity.

Processor 220 may include any type of conventional processor or microprocessor that interprets and executes instructions. Main memory 230 may include a random access memory (RAM) or another type of dynamic storage device that stores information and instructions for execution by processor 220. ROM 240 may include a conventional ROM device or another type of static storage device that stores static information and instructions for use by processor 220. Storage device 250 may include a magnetic and/or optical recording medium and its corresponding drive.

Input device(s) 260 may include one or more conventional mechanisms that permit an operator to input information to the client/server entity, such as a keyboard, a mouse, a pen, voice recognition and/or biometric mechanisms, etc. Output device(s) 270 may include one or more conventional mechanisms that output information to the operator, including a display, a printer, a speaker, etc. Communication interface 280 may include any transceiver-like mechanism that enables the client/server entity to communicate with other devices and/or systems. For example, communication interface 280 may include mechanisms for communicating with another device or system via a network, such as network 150.

As will be described in detail below, the client/server entity, consistent with the principles of the invention, performs certain searching-related operations. The client/server entity may perform these operations in response to processor 220 executing software instructions contained in a computer-readable medium, such as memory 230. A computer-readable medium may be defined as one or more physical or logical memory devices and/or carrier waves.

The software instructions may be read into memory 230 from another computer-readable medium, such as data storage device 250, or from another device via communication interface 280. The software instructions contained in memory 230 causes processor 220 to perform processes that will be described later. Alternatively, hardwired circuitry may be used in place of or in combination with software instructions to implement processes consistent with the principles of the invention. Thus, implementations consistent with the principles of the invention are not limited to any specific combination of hardware circuitry and software.

Exemplary Computer-Readable Medium

FIG. 3 is a diagram of an exemplary computer-readable medium 300 that may be associated with a server that provides news alerts, such as server 120 in FIG. 1, according to an implementation consistent with the principles of the invention. The contents of computer-readable medium 300 may physically reside in one or more memory devices accessible by server 120. Computer-readable medium 300 may include a database of entries corresponding to news alerts registered by users. Each of the entries may include an e-mail address field 310, keyword(s) field 320, and timing field 330.

E-mail address field 310 may store an e-mail address of a user. A user may have multiple entries in the database corresponding to multiple different news alerts. Keyword(s) field 320 may store one or more words or a search string (as will be described in more detail below). Timing field 330 may store an indication of when (e.g., time of arrival) or how often (e.g., frequency) the user desires to be presented with news alerts. In one implementation, the user might choose between "as it happens" (news alerts are sent to the user when server 120 receives them) and "once a day" (news alerts are sent to the user once per day). In other implementations, the user might be given other timing options, such as twice a day or at certain time(s) of the day or day(s) of the week. In yet other implementations, the user might be given combinations of these timing options, such as as it happens between certain times of the day.

Exemplary Processing

FIGS. 4A and 4B are flowcharts of exemplary processing for providing news alerts according to an implementation consistent with the principles of the invention. Processing may begin with a user registering for the news alert service using client 110 (act 410) (FIG. 4A). For example, the user may use a browser to access a web page associated with server 120 to register for the news alert service. Server 120 may provide one or more graphical user interfaces to the user to facilitate the news alert registration.

Figure 5:
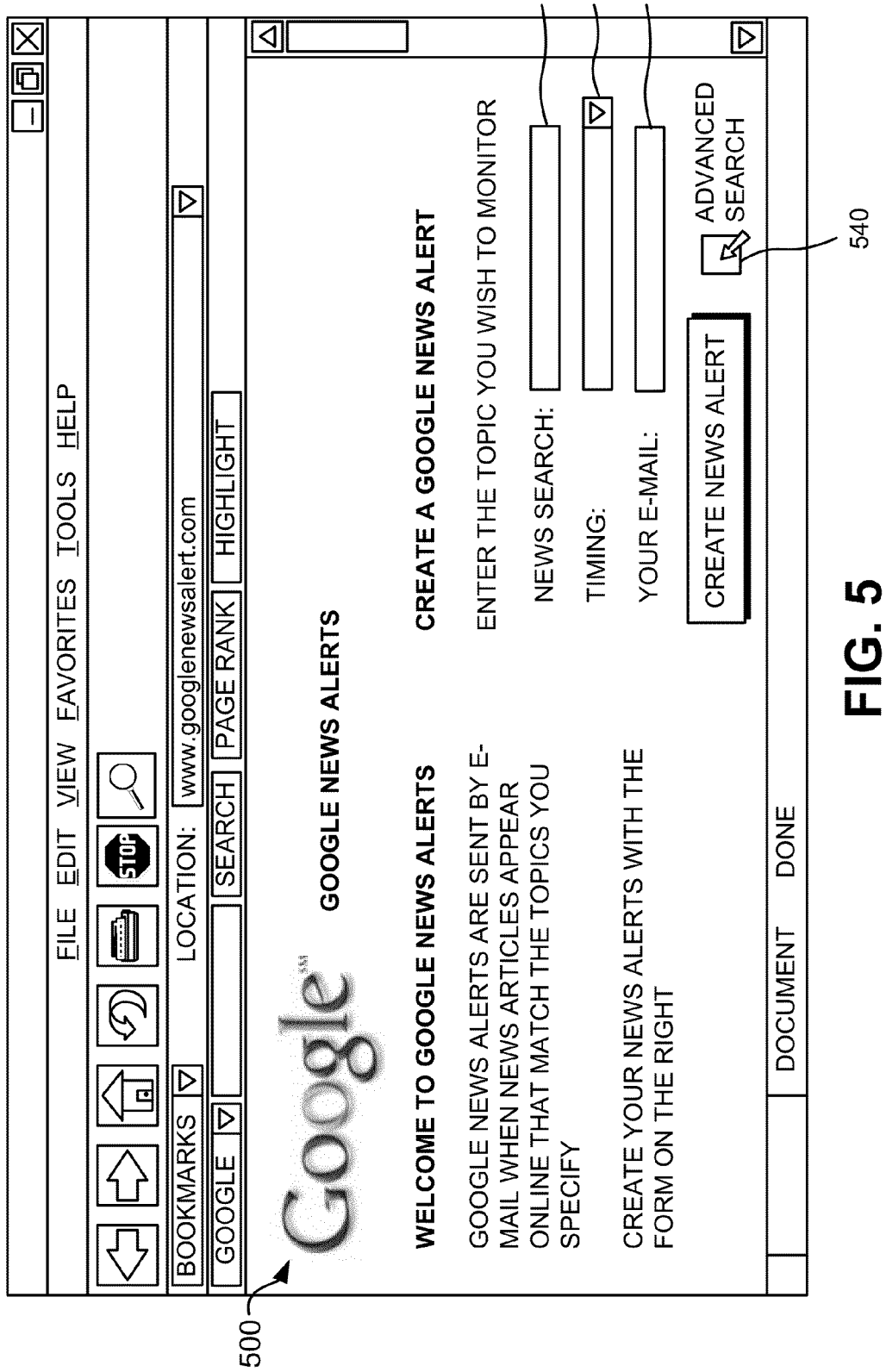
FIG. 5 is an exemplary diagram of a graphical user interface that may be used for registration according to an implementation consistent with the principles of the invention.

FIG. 5 is an exemplary diagram of a graphical user interface 500 that may be used for registration according to an implementation consistent with the principles of the invention. Graphical user interface 500 may include an option for the user to create a news alert. Graphical user interface 500 may provide an area 510 for keywords, an area 520 for timing (e.g., time of arrival or frequency) information, and an area 530 for an e-mail address. In area 510, the user may enter one or more keywords that relate to a topic of interest to the user. In area 520, the user may enter the timing for notifications (e.g., the times or frequency at which the user desires to be notified of relevant news articles). For example, the user may specify that the user desires news alerts as they happen or once a day. In area 530, the user may enter an e-mail address to which the news alerts may be sent.

Graphical user interface 500 may also permit the user to enter an advanced search instead of entering one or more keywords. The advanced search may provide the user with the ability to provide additional information to tailor the news articles that the user will receive. In one implementation, the user enters the advanced search terms via area 510. In another implementation, graphical user interface 500 may provide a selectable advanced search button 540. Selection of advanced search button 540 may cause presentation of an advanced search page.

Figure 6:
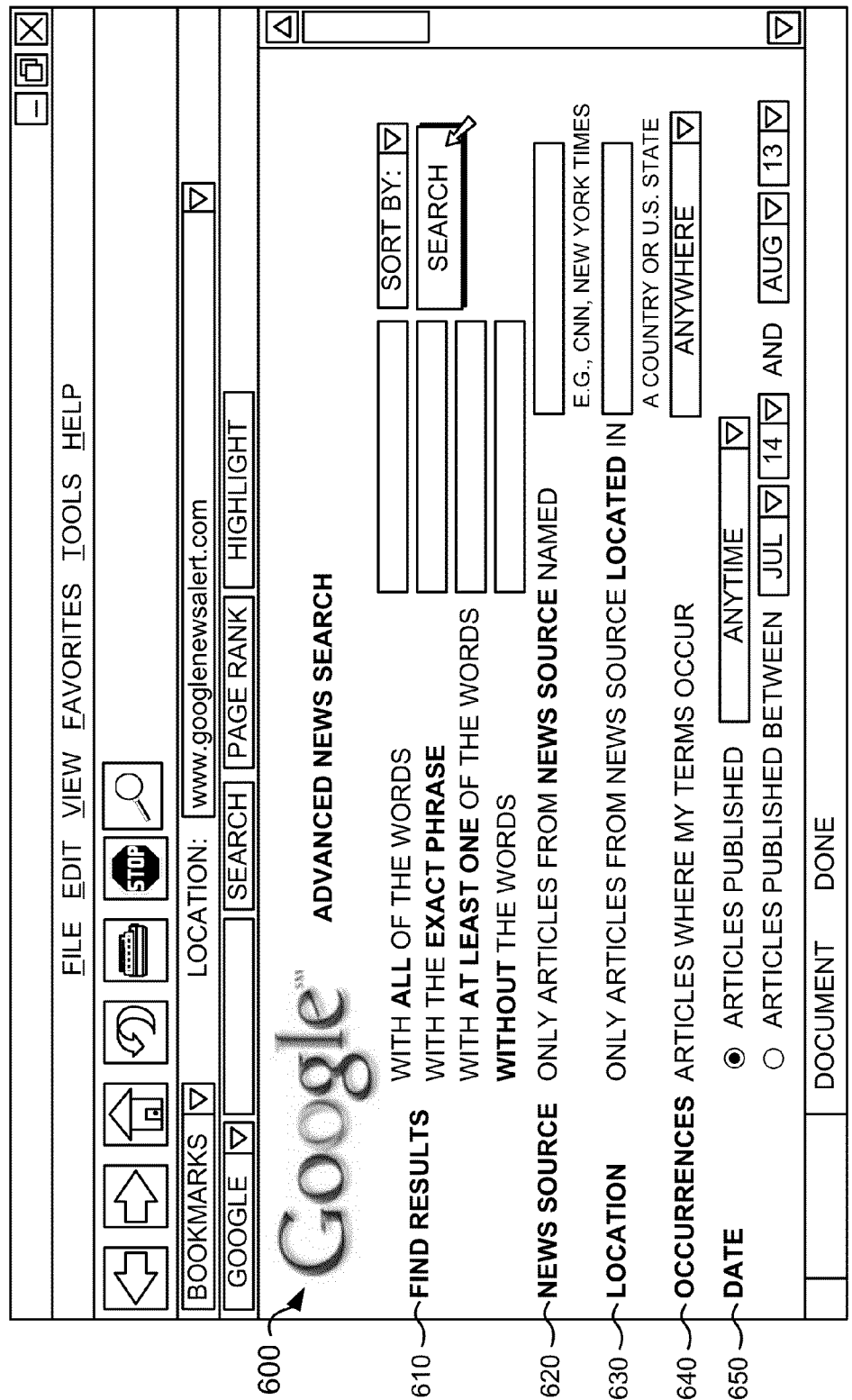
FIG. 6 is an exemplary diagram of a graphical user interface that may be used for entering an advanced news search according to an implementation consistent with the principles of the invention.

FIG. 6 is an exemplary diagram of a graphical user interface 600 that may be used for entering an advanced news search according to an implementation consistent with the principles of the invention. Graphical user interface 600 may provide an area 610 for providing one or more keywords, an area 620 for identifying a source of news articles, an area 630 for identifying a location of news sources, an area 640 for identifying where the one or more keywords are to be located within a news article, and an area 650 for specifying a date for news articles.

In area 610, a user may enter one or more words that should all appear together in a returned news article (i.e., a news article for which a news alert may be generated and sent to the user), a phrase that should appear exactly in a returned news article, one or more words at least one of which should appear in a returned news article, and one or more words that should not appear in a returned news article. In area 620, a user may enter one or more news sources (e.g., CNN, New York Times, Washington Post) from which all returned news articles should originate. It may also be possible for the user to specify the type of news media the user desires. For example, the user might specify that the user desires news articles that include audio data (e.g., an audio clip), video data (e.g., a video clip), and/or image data (e.g., a picture). In other words, the user may specify, for example, that the user desires only relevant news articles that include a picture.

In area 630, a user may enter one or more geographical locations (e.g., a country or a U.S. state) from which all returned news articles should originate. In area 640, a user may identify where the specified one or more keywords should be located in a returned news article. For example, the user may identify that the one or more keywords be located anywhere in the news article, in the headline of the news article, in the body of the news article, in connection with image, video, and/or audio data associated with the news article, or in the uniform resource locator (URL) associated with the news article. In area 650, a user may select a publication date associated with returned news articles. For example, the user may specify that news articles published at any time, within the last hour, within the last day, in the past week, or in the past month should be returned. Alternatively, the user may specify that news articles published within a date range should be returned.

Based on the information provided by the user via graphical user interface 600, server 120 may generate a search string. Server 120 may cause the search string to automatically populate area 510 of graphical user interface 500. Alternatively, server 120 may provide the search string to the user. In this case, the user may enter the search string in area 510.

Via graphical user interface 500 and/or graphical user interface 600, server 120 may receive a user e-mail address, one or more keywords (possibly in the form of a search string), and timing information (acts 412-416) (FIG. 4A). Server 120 may optionally send a registration notification to the user to obtain verification of the news alert registration from the user (act 418). For example, server 120 may send an e-mail to the user that confirms that the news alert has been registered.

FIG. 7 is an exemplary diagram of a registration notification 700 that may be transmitted to a user according to an implementation consistent with the principles of the invention. Registration notification 700 may include a confirmation 710 of the substance of the newly registered news alert, including the one or more keywords of the news alert and the e-mail address to which the news alerts will be sent. Registration notification 700 may also include a link 720 for verifying the news alert registration and a link 730 for canceling the news alert registration.

To verify the news alert registration, the user may select link 720. Selection of link 720 may cause a message to be sent to server 120 confirming registration of the news alert. Server 120 may then optionally present an initial set of relevant news articles to the user (act 420). For example, server 120 may perform a search of an existing news corpus based at least in part on the keyword(s) received from the user (act 422). In one implementation, server 120 may send the keyword(s) to server 130 and request return of news articles relevant to the keyword(s).

Server 130 may use the keyword(s) to search its news corpus, identify relevant results, and rank the results. Server 130 may rank the results based on a number of factors, such as whether the results include the keyword(s) (e.g., a result that includes all of the keyword(s) may be ranked higher than a result that includes less than all of the keyword(s), a result that includes the keyword(s) in a more prominent location (e.g., in a title) may be ranked higher than a result that includes the keyword(s) in a less prominent location (e.g., in fine print), etc.), the source of the results (e.g., a result from a more reputable source may be ranked higher than a result from a less reputable source), other factors, or a combination of factors. In one implementation, server 130 may rank the results using, for example, a technique similar to the ones disclosed in U.S. patent application Ser. No. 10/662,931, U.S. patent application Ser. No. 10/611,269, and U.S. patent application Ser. No. 10/611,267. Server 130 may then return the ranked results to server 120. In an alternative implementation, server 120 may perform the searching of the news corpus and/or the ranking of the results itself.

In any event, server 120 may present some or all of the ranked results to the user as an initial set of news articles (act 424). In one implementation, server 120 may form a news descriptor for each of the news articles in the initial set of news articles. A news descriptor may include the headline of the news article, a link to the news article, and an excerpt from the news article. The news descriptor may also include one or more links to other stories on this topic. In another implementation, the news descriptor may include other information, such as the entire news article, audio, video, and/or image data associated with the news article, or a publication date of the news article. The particular information included in the news descriptor may be specified by the user during registration of the news alert. Server 120 may send the news descriptors as a news alert in an e-mail to the user.

FIG. 8 is an exemplary diagram of a news alert 800 that may be used according to an implementation consistent with the principles of the invention. News alert 800 may include news descriptors 810, a link 820 to cancel the news alert, and a link 830 to create another news alert. As described above, a news descriptor 810 may include the headline of the news article, a link to the news article, an excerpt from the news article, and, possibly, a link to other stories on this topic. A user may select either link 820 or link 830 to cancel the news alert or create another news alert, respectively.

After presenting the initial set of news articles, server 120 may periodically present the user with new results of recent (or current) news articles (act 430) (FIG. 4B). For example, server 120 may periodically search the news corpus for recent (or current) news articles relevant to the keyword(s) (act 432). The frequency at which server 120 may search the news corpus may be based at least in part on the timing information specified by the user. For example, server 120 may perform the search once a day, once an hour, or more or less frequently.

To search the news corpus, server 120 may send the keyword(s) to server 130 and request return of news articles relevant to the keyword(s). Server 130 may use the keyword(s) to search its news corpus, identify relevant results, and rank the results using, for example, a technique similar to the ones disclosed in U.S. patent application Ser. No. 10/662,931, U.S. patent application Ser. No. 10/611,269, and U.S. patent application Ser. No. 10/611,267. Server 130 may then return the ranked results to server 120. In an alternative implementation, server 120 may perform the searching of the news corpus, the identifying of relevant results, and/or the ranking of the results itself.

In any event, server 120 may obtain ranked results and possibly remove from these results those news articles that server 120 does not consider recent (or current). For example, server 120 may remove those news articles that were not published (e.g., created, made public, or received by server 130) since the last time server 120 searched the news corpus. Alternatively, server 130 may remove these news articles prior to sending the ranked results to server 120.

Server 120 may then present some or all of the ranked results to the user as one or more relevant news articles (act 434). For example, server 120 may form a news descriptor for each of the relevant news articles. As described above, a news descriptor may include, for example, the headline of the news article, a link to the news article, and an excerpt from the news article. Alternatively, the news descriptor may contain other information, as also described above. Server 120 may send the news descriptors associated with the relevant news articles in an e-mail to the user.

At some point, the user may desire to cancel future news alerts (act 440). To do this, the user may, for example, select link 820 (FIG. 8) in a news alert that the user has received. Selection of link 820 may cause a message to be sent to server 120 confirming cancellation of future news alerts. Server 120 may receive the cancellation message and cancel the news alert for this user on this topic (acts 442 and 444). For example, cancellation of the news alert may involve server 120 deleting the associated entry from the database or marking it appropriately in computer-readable medium 300 (FIG. 3).

CONCLUSION

Systems and methods consistent with the principles of the invention provide relevant news alerts to users. The news alert service provided by server 120, for example, may render other news alert services provided by individual news sources redundant because those news sources are crawled by server 130. For example, instead of registering with NYTimes.com for a certain topic and then again registering with CNN for the same topic, an individual may simply register a set of keywords with server 120 as a persistent news search. Thereafter, server 120 may notify the individual whenever there are new articles available (that match user's keywords) on any of thousands of news sources scoured by server 130 (not just New York Times or CNN).

Even if an individual cares about related articles published only in the New York Times, that individual can simply register an advanced search for [<keywords>new York times] with server 120. As a result, server 120 will send news alerts concerning only New York Times news articles.

Furthermore, users are in the best position to explain what exactly they want. This way, they can make their topic as broad or specific as they want. If the user registered with NYTimes.com, for example, the user is stuck with selecting from a limited set of topics. So, there is no real way of specifying what the user exactly wants. For example, the user may not want to sign up for alerts on [Microsoft], but would rather like to receive any news alerts that pertain to [Microsoft security flaw]. Systems and methods consistent with the principles of the invention would allow just that. In fact, a user could use any or all of the advanced search features described above to tailor his/her queries accordingly.

In addition, the news articles sent out by server 120 are much more relevant than those sent by individual news sites. Determining the relevancy of an article based on the keywords provided by the user is a tricky process. Therefore, existing news alert services either do not allow the users to specify their own keywords or they offer a predetermined set of topics from which to choose. On the other hand, server 120 piggybacks on the news service of server 130 to effectively figure out the relevance of the articles based on various parameters in the context of user specified keywords.

Moreover, because server 130 crawls thousands of news sources, server 120 may notify a user whenever there is a relevant article from any of the news sources. For example, this would be a great way of tracking company-specific news coverage for all public relations managers.

Moreover, systems and methods consistent with the principles of the invention make it easy to set up news alerts, cancel the news alerts, and change the frequency of the news alerts. Also, the news alerts permit users to choose, for example, between alerts that are sent as frequently as possible and alerts that are sent hourly, daily, weekly, etc.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, while series of acts have been described with regard to FIGS. 4A and 4B, the order of the acts may be modified in other implementations consistent with the principles of the invention. Also, non-dependent acts may be performed in parallel.

Also, it has been described that server 120 acts in conjunction with a server (e.g., server 130) that crawls thousands of news sources to create a news corpus. In other implementations, server 120 crawls these news sources to determine when new articles are present and/or to create its own news corpus.

Moreover, it has been described that server 120 notifies a user of a news alert via e-mail. In other implementations, other forms of notification may be used. For example, server 120 may place a telephone call to the user, send an instant message, page, or fax, send a voice alert to the user's wireless device, and/or provide another form of notification.

Also, in another implementation, server 120 may not send a notification at all. In this case, server 120 may store the news alerts for retrieval by the users. Users may need to establish accounts and use passwords to log into their accounts. Once they are logged in, they may view all of the alerts that have been received thus far. The users may then delete the alerts or save them for later viewing.

What is claimed is:

1. A method, performed by one or more server devices, the method comprising:
   receiving, at one or more processors of the one or more server devices and from a user, information for generating a news alert,
      the information for generating the news alert including:
         information that identifies search terms relating to a topic of interest to the user,
         an indication of a location at which the search terms are to be located within news articles,
         information identifying one or more sources from which the news articles are to originate, and
         information identifying one or more geographical locations from which the news articles are to originate;
   generating, by the one or more processors of the one or more server devices, a search string based on the information for generating the news alert;
   periodically searching, by one or more processors of the one or more server devices, news articles from a plurality of sources of news articles without user intervention and based on the search string;
   identifying, by one or more processors of the one or more server devices and based on the searching, news articles relating to the topic of interest to the user,
      identifying the news articles including:
         determining a plurality of news articles related to the topic of interest,
         ranking the plurality of news articles, and
         removing one or more news articles, from the ranked plurality of news articles, that do not include the search terms at the location, to identify the news articles related to the topic of interest that include the search terms at the indicated location, that originate from the one or more sources and the one or more geographic locations;
   generating, by one or more processors of the one or more server devices, the news alert that includes information associated with one or more of the identified news articles; and
   providing, by one or more processors of the one or more server devices, the news alert to a device associated with the user.

2. The method of claim 1, where receiving the information for generating the news alert includes:
   receiving contact information for the user, and receiving one or more keywords related to the search terms from the user;

where generating the search string includes:
    generating the search string based on the one or more keywords;
where providing the news alert includes:
    providing the news alert to the device based on the contact information.

3. The method of claim 1, where the information for generating the news alert further includes at least one of:
   two or more words that are to all appear together in a same one of the identified news articles,
   a phrase,
   two or more words, at least one of which is to appear in one of the identified news articles, or
   one or more words that should not appear in the identified news articles.

4. The method of claim 1, where the information for generating the news alert further includes timing information that identifies a timing at which the user desires to be provided with news alerts; and
   where providing the news alert includes:
      sending the news alert to the user based on the timing information.

5. The method of claim 1, where generating the news alert includes:
   generating one or more news descriptors corresponding to the one or more of the identified news articles, and
   including the one or more news descriptors in the news alert.

6. The method of claim 5, where each of the one or more news descriptors includes at least one of a headline of the corresponding news article, a link to the corresponding news article, or an excerpt from the corresponding news article.

7. The method of claim 1, where removing the one or more news articles includes:
   removing one or more news articles, from the plurality of news articles, that do not originate from the one or more geographical locations or the one or more sources to identify the news articles related to the topic of interest.

8. A system, comprising:
   a memory to store instructions; and
   a processor to execute the instructions in the memory to:
      receive, from a user, a information for generating a news alert, the information for generating the new alert including:
         one or more words,
         an indication of a location at which the one or more words are to be located within news articles,
         information identifying one or more sources from which the news articles are to originate, and
         information identifying one or more geographical locations from which the news articles are to originate,
      generating, based on the information for generating the news alert, a search string;
      automatically search current news articles, at a periodic interval and based on the search string, to identify current news articles, related to the search string, that include the one or more words in the indicated location, and that originate from the one or more sources and the one or more geographic locations,
      when automatically searching the current news articles, the processor is to:
         determine a plurality of current news articles related to the search string,
         rank the plurality of current news articles, and
         remove one or more current news articles, from the ranked plurality of current news articles, that do not include the one or more words in the indicated location, to identify the current news articles, related to the search string, that include the one or more words in the indicated location, and that originate from the one or more sources and the one or more geographic locations,
      generate a news alert based on the identified current news articles, and
      transmit the news alert.

9. The system of claim 8, where the information for generating the new alert further includes at least one of:
   two or more words that are to all appear together in a same one of the current news articles,
   a phrase,
   two or more words at least one of which is to appear in one of the current news articles, or
   one or more words that should not appear in the current news articles.

10. The system of claim 9, where the information for generating the news alert further includes a preference for current news articles that include at least one of audio data, video data, or image data.

11. The system of claim 9, where the information for generating the news alert is received from the user during a registration process.

12. The system of claim 9, where the information for generating the news alert includes one or more news descriptors corresponding to the identified current news articles,
   where each of the one or more news descriptors includes at least one of a headline of the corresponding current news article, a link to the corresponding current news article, or an excerpt from a corresponding current news article.

13. A method, performed by one or more server devices, the method comprising:
   receiving, at one or more processors of the one or more server devices, one or more search terms from a user;
   receiving, at one or more processors of the one or more server devices, an indication of one or more geographical locations from which news articles are to originate, an indication of a location at which the one or more search terms are to be located within the news articles, and information identifying one or more sources from which the news articles are to originate;
   generating, by one or more processors of the one or more server devices, a search string based on the indication of one or more geographical locations from which the news articles are to originate, the indication of the location at which the one or more search terms are to be located within the news articles, and the information identifying the one or more sources;
   periodically searching, by one or more processors of the one or more server devices, for current news articles from a corpus of news articles that originated from the one or more sources without user intervention and based on the search string
   periodically searching for the current news articles including:
      determining a plurality of current news articles related to the search string,
      ranking the plurality of current news articles, and
      removing one or more current news articles, from the ranked plurality of current news articles, that do not include the one or more search terms at the indicated location, to identify the current news articles that include the one or more search terms at the indicated location and that originated from the one or more sources and the one or more geographical locations; and sending, by one or more processors of the one or more server devices, a news alert, that includes information associated with one or more of the current news articles, to the user.

14. The method of claim 13, where the information associated with the one or more of the current news articles includes news descriptors corresponding to the one or more of the current news articles, where the news descriptors includes at least one of a headline of the corresponding current news article, a link to the corresponding current news article, or an excerpt from a corresponding current news article.

15. The method of claim 14, where periodically searching for the current news articles includes:

periodically sending information relating to the one or more search terms to an external device, and receiving, from the external device, search results that include the information associated with the current news articles.

16. The method of claim 14, where periodically searching for the current news articles includes periodically searching for the current news articles based on a user preference for news articles that include audio data, news articles that include video data, or news articles that include image data.

17. The method of claim 14, where the one or more search terms include a previously registered search string.

18. The method of claim 14, where the one or more search terms include keywords associated with user topics.

* * * * *